(12) United States Patent
Hase et al.

(10) Patent No.: US 9,708,432 B2
(45) Date of Patent: Jul. 18, 2017

(54) HIGHLY SENSITIVE (METH)ACRYLATE AND RADICAL CURABLE MATERIAL

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP); KYUSHU UNIVERSITY, Fukuoka-shi, Fukuoka (JP)

(72) Inventors: Tatsuya Hase, Yokkaichi (JP); Kazuo Nakashima, Yokkaichi (JP); Makoto Mizoguchi, Chikushino (JP)

(73) Assignees: AUTONETWORKS TECHNOLOGIES, LTD., Mie (JP); SUMITOMO WIRING SYSTEMS, LIMITED, Mie (JP); SUMITOMO ELECTRIC INDUSTRIES, LTD., Osaka (JP); KYUSHU UNIVERSITY, Fukuoka (JP)

( * ) Notice: Subject to any disclaimer, the term of this patent is extended or adjusted under 35 U.S.C. 154(b) by 12 days.

(21) Appl. No.: 14/766,384

(22) PCT Filed: Aug. 9, 2013

(86) PCT No.: PCT/JP2013/071650
§ 371 (c)(1),
(2) Date: Aug. 6, 2015

(87) PCT Pub. No.: WO2014/128992
PCT Pub. Date: Aug. 28, 2014

(65) Prior Publication Data
US 2016/0017071 A1    Jan. 21, 2016

(30) Foreign Application Priority Data

Feb. 25, 2013 (JP) ................................ 2013-034935

(51) Int. Cl.
| | | |
|---|---|---|
| *C08F 2/46* | (2006.01) | |
| *C08F 2/50* | (2006.01) | |
| *C08G 61/04* | (2006.01) | |
| *C08F 220/18* | (2006.01) | |
| *C09J 4/00* | (2006.01) | |
| *C08F 220/36* | (2006.01) | |
| *C08F 222/20* | (2006.01) | |
| *C08F 220/20* | (2006.01) | |
| *C09D 4/00* | (2006.01) | |
| *C08L 33/06* | (2006.01) | |

(52) U.S. Cl.
CPC .......... *C08F 220/18* (2013.01); *C08F 220/36* (2013.01); *C08F 222/20* (2013.01); *C09J 4/00* (2013.01); *C08F 220/20* (2013.01); *C08L 33/06* (2013.01); *C09D 4/00* (2013.01)

(58) Field of Classification Search
CPC ..... C08F 220/18; C08F 220/36; C08F 222/20
USPC ............... 522/8, 7, 6, 71, 189, 184, 1; 520/1
See application file for complete search history.

(56) References Cited

U.S. PATENT DOCUMENTS

| | | | |
|---|---|---|---|
| 446,175 A | | 2/1891 | Scantlebury |
| 4,446,175 A | | 5/1984 | Brixius et al. |
| 4,474,855 A | | 10/1984 | Brixius et al. |
| 5,849,270 A | * | 12/1998 | Podszun .............. A61K 6/0023 424/55 |
| 2005/0065310 A1 | * | 3/2005 | Wang .................... C08G 18/10 528/44 |
| 2006/0058549 A1 | | 3/2006 | Stone et al. |
| 2006/0079660 A1 | * | 4/2006 | Ludewig ................ C08G 18/73 528/44 |
| 2006/0205911 A1 | * | 9/2006 | Ludewig .............. C08G 18/672 528/44 |
| 2007/0232751 A1 | * | 10/2007 | Ludewig ............ C08G 18/6633 524/589 |
| 2010/0273909 A1 | * | 10/2010 | Ogawa ................ C08F 290/067 522/90 |
| 2010/0291640 A1 | | 11/2010 | Stuermer et al. |

(Continued)

FOREIGN PATENT DOCUMENTS

| | | |
|---|---|---|
| EP | 0 424 750 A2 | 5/1991 |
| JP | H03-140325 A | 6/1991 |

(Continued)

OTHER PUBLICATIONS

Kato et al, JP 2011-032405 Machine translation, Feb. 17, 2011.*
Oct. 30, 2015 Search Report in European Patent Application No. 13 875 871.9.
Nov. 5, 2013 Search Report issued in International Patent Application No. PCT/JP2013/071650.

(Continued)

Primary Examiner — Jessica E Whiteley
(74) Attorney, Agent, or Firm — Oliff PLC

(57) ABSTRACT

Provided is a (meth)acrylate and a radical curable material with which the sensitivity can be enhanced to improve the curability, the increase in viscosity can be suppressed due to good compatibility with various acrylate compounds, and there is no risk that the physical properties of the curable material are deteriorated. The (meth)acrylate has one or more structures represented by Formula 1 in the molecule, and when the (meth)acrylate is used for radical curing, the sensitivity is enhanced. In Formula 1, $R_1$ is a hydrogen atom or a methyl group, $R_2$ is a $C_1$-$C_{10}$ alkyl chain, $R_3$ is either Formula 2 or 3, and $R_4$ is an alkyl chain constituted by carbon atoms and hydrogen atoms.

16 Claims, No Drawings

(56) References Cited

U.S. PATENT DOCUMENTS

| | | | | |
|---|---|---|---|---|
| 2011/0042004 | A1* | 2/2011 | Schubert | C08G 18/0866 156/329 |
| 2012/0055693 | A1* | 3/2012 | Yamaguchi | C08F 283/008 174/110 R |
| 2012/0145432 | A1* | 6/2012 | Yamaguchi | C08F 290/062 174/110 SR |
| 2012/0268828 | A1* | 10/2012 | Chen | B29D 11/00317 359/642 |

FOREIGN PATENT DOCUMENTS

| | | |
|---|---|---|
| JP | 2003-277342 A | 10/2003 |
| JP | 2006-509792 A | 3/2006 |
| JP | 2010-150517 A | 7/2010 |
| JP | 2011-032405 * | 2/2011 |
| JP | 2011-032405 A | 2/2011 |
| JP | 2012-520383 A | 9/2012 |
| JP | 2012-526742 A | 11/2012 |
| JP | 2012-251034 A | 12/2012 |

OTHER PUBLICATIONS

Dec. 14, 2015 Search Report issued in European Patent Application No. 13875871.9.

Jun. 7, 2016 Office Action issued in Japanese Application No. 2013-034935.

Apr. 6, 2016 Office Action issued in Chinese Application No. 201380073771.7.

Jan. 6, 2017 Office Action issued in Chinese Application No. 201380073771.7.

* cited by examiner

HIGHLY SENSITIVE (METH)ACRYLATE AND RADICAL CURABLE MATERIAL

TECHNICAL FIELD

The present invention relates to a (meth)acrylate compound (also referred to merely as "(meth)acrylate" hereinafter) and a radical curable material using the (meth)acrylate, and more specifically to a (meth)acrylate and a radical curable material used in an adhesive material, a coating material, a sealing material, a molding material and the like of an automobile, an electrical/electronic device, an aircraft component and the like. It should be noted that the term "(meth)acrylate" means an acrylate and/or a methacrylate in the present invention.

BACKGROUND ART

A (meth)acrylate has a radical curability, and is widely used as a curable material in a system including only a (meth)acrylate or a system in which a (meth)acrylate and a radical polymerization initiator are mixed. In particular, a mixture of a (meth)acrylate and a photo radical generator is used as a photo curable material, and a mixture of a (meth)acrylate and a heat radical generator is used as a heat curable material.

Since a (meth)acrylate used in a curable material is generally cured only at positions where radicals are generated, it is difficult to uniformly cure a material having a shape that is unlikely to be uniformly illuminated or heated. Therefore, a special chain transfer agent is further added thereto to improve the curability (see Patent Document 1, for example).

CITATION LIST

Patent Documents

Patent Document 1: JP 2012-251034A

SUMMARY OF INVENTION

Technical Problem

An ultraviolet curable composition described in Patent Document 1 is a combination of a chain transfer agent and an ultraviolet curable material that is constituted by a (meth)acrylate and a photopolymerization initiator. One example of the above chain transfer agent is an agent containing a metal-containing compound and a (meth)acrylate obtained by reacting polypropylene glycol having a molecular weight of 400 with hexamethylene diisocyanate under excess molarity conditions and by further reacting the residual isocyanate groups to generate acrylate groups at its ends (see Working Examples in Patent Document 1).

However, in the system in which a chain transfer agent is added to a (meth)acrylate as described above, there is a problem in that an effort and a time to mix the (meth)acrylate and the chain transfer agent are needed.

Moreover, when a material such as a chain transfer agent is mixed with a (meth)acrylate, it is necessary to sufficiently take the compatibility of the materials, the viscosity thereof, and the like into consideration. If the (meth)acrylate and the chain transfer agent are insufficiently mixed or their compatibility is insufficient, there is a problem in that the physical properties of a produced curable material may be deteriorated.

The present invention was made in order to eliminate the foregoing disadvantages of the conventional technology, and it is an object thereof to provide a (meth)acrylate and a radical curable material with which the sensitivity as a (meth)acrylate can be enhanced to improve the curability, the increase in viscosity can be suppressed due to good compatibility with various (meth)acrylates, and there is no risk that the physical properties of the curable material are deteriorated.

Solution to Problem

In order to solve the foregoing problems, a (meth)acrylate compound according to the present invention has one or more structures represented by Formula 1 in a molecule, and is used for radical curing to enhance sensitivity.

[Chemical Formula 1]

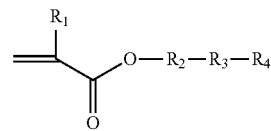

Formula 1

In Formula 1, $R_1$ is a hydrogen atom or a methyl group, $R_2$ is a $C_1$-$C_{10}$ alkyl chain, $R_3$ is either Formula 2 or 3 below, and $R_4$ is an alkyl chain constituted by carbon atoms and hydrogen atoms.

[Chemical Formula 2]

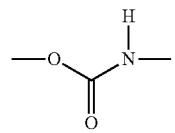

Formula 2

[Chemical Formula 3]

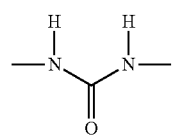

Formula 3

In the (meth)acrylate, it is preferable that a molar content of the structure represented by Formula 2 or 3 (mole of functional group·bonding group per mass of (meth)acrylate) is 0.001 mol/g or more.

A radical curable material according to the present invention contains the above (meth)acrylate.

It is preferable that the radical curable material contains a metal-containing compound.

In the radical curable material, it is preferable that the metal-containing compound contains at least one metal selected from tin, copper, zinc, cobalt, and nickel.

In the radical curable material, it is preferable that $R_4$ in Formula 1 is one of a $C_1$-$C_{18}$ linear alkyl group, branched alkyl group, and cyclic alkyl chain, or a derivative thereof.

Advantageous Effects of the Invention

The (meth)acrylate according to the present invention has one or more specific structures in one molecule, and when the (meth)acrylate is used for radical curing, its sensitivity is enhanced. Therefore, the sensitivity as a (meth)acrylate can be enhanced to improve the curability, the viscosity can be suppressed due to good compatibility with various (meth) acrylates, and there is no risk that the physical properties of a curable material are deteriorated.

Since the radical curable material according to the present invention contains the above (meth)acrylate, a high sensitivity and excellent curability thereof can be obtained, the viscosity of the curable material can be suppressed, and there is no risk that the physical properties thereof are deteriorated.

DESCRIPTION OF EMBODIMENTS

Hereinafter, an embodiment of the present invention will be described in detail. A (meth)acrylate according to the present invention has one or more structures represented by Formula 1 in the molecule, and when the (meth)acrylate is used for radical curing, the sensitivity of deep portion curability or the like is enhanced. It should be noted that deep portion curability refers to a curability of a deep portion that is not irradiated with light from a light source or that is not heated by a heat source, and is also referred to as "dark portion curability" in the case of photo curing.

In Formula 1, $R_1$ is a hydrogen atom or a methyl group. If $R_1$ is a hydrogen atom, the (meth)acrylate represented by Formula 1 is an acrylate having an acryloyl group, and if $R_1$ is a methyl group, the (meth)acrylate represented by Formula 1 is a methacrylate having a methacryloyl group.

In Formula 1, $R_2$ is a $C_1$-$C_{10}$ alkyl chain. The alkyl chain represented by $R_2$ may be linear or cyclic, include an unsaturated bond and a branched alkyl chain, and include a substituent, an ether bond and a thioether bond.

In Formula 1, $R_3$ is either a urethane bond represented by Formula 2 below or a urea bond represented by Formula 3 below. When these bonds are introduced to a (meth)acrylate molecule, a chain transfer action can be provided to the (meth)acrylate molecule. It is preferable that the molar content of the structure represented by Formula 2 or 3 in the above (meth)acrylate (mole of functional group/bonding group per mass of (meth)acrylate) is 0.001 mol/g or more. When the content of the above structure is set to the above range, it is possible to further enhance the deep portion curability and to further improve the sensitivity of the curable material.

[Chemical Formula 4]

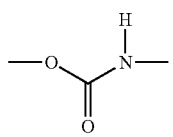

Formula 2

[Chemical Formula 5]

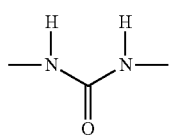

Formula 3

In Formula 1, $R_4$ is an alkyl chain constituted by carbon atoms and hydrogen atoms. $R_4$ is an alkyl chain that is not constituted by a polymer, may be linear or cyclic, and may include an unsaturated bond and a branched alkyl chain. When $R_4$ has an alkyl chain structure that is not constituted by a polymer in this manner, the molecular structure is simplified and can be configured to have a low molecular weight, thus making it possible to improve the compatibility with various acrylates. It is preferable that in Formula 1, $R_4$ is one of a $C_1$-$C_{18}$ linear alkyl group, branched alkyl group, and cyclic alkyl chain, or a derivative thereof because the compatibility is further improved.

The above (meth)acrylate may be any of a monofunctional (meth)acrylate having only one acryloyl group or methacryloyl group in one molecule, a difunctional (meth) acrylate having two acryloyl groups or methacryloyl groups in one molecule, and a polyfunctional (meth)acrylate having three or more acryloyl groups or methacryloyl groups in one molecule. The (meth)acrylate is preferably a (meth)acrylate having four or less functional groups in one molecule, and more preferably a (meth)acrylate having three or less functional groups in one molecule, because the viscosity does not become too high and a handling is facilitated.

When the (meth)acrylate has a plurality of acryloyl groups or methacryloyl groups as a difunctional or polyfunctional (meth)acrylate, the (meth)acrylate may include a plurality of above bonding portions represented by $R_2$ or $R_3$ according to the number of the acryloyl groups or methacryloyl groups.

The above (meth)acrylate has the following advantages compared with a conventional chain transfer agent. For example, a chain transfer agent for improving the sensitivity of a radical curable material (also referred to merely as a "curable material" hereinafter) such as a conventional photo curable material or a heat curable material is used as an additive in an intended curable material. However, the conventional chain transfer agent is basically different from the (meth)acrylate contained in the intended curable material in a structure, and therefore, some combinations of the chain transfer agent and the (meth)acrylate may be unlikely to be compatible with each other, and easily separate and precipitate. Even if separation or precipitation occurs in a curable material including the (meth)acrylate, there is no problem with curing sensitivity and deep portion curing if a portion of the chain transfer agent acts on the curable material. However, when an attempt is made to improve the physical properties of a cured product, the material in which separation or precipitation has occurred adversely affects the strength, flexibility and elongation, and it is difficult to obtain an intended physical property value. If a chain transfer agent is constituted by a polymer and has a high molecular weight, the chain transfer agent itself has a high viscosity. Furthermore, when an attempt is made to introduce a sufficient amount of structures represented by Formula 2 or 3 into a curable material, it is necessary to add the chain transfer agent having a high molecular weight in an increased amount. Therefore, if the chain transfer agent having a high molecular weight is used, there is a risk that it is difficult to obtain a low-viscosity curable material.

If a compound that has chain transfer properties and can improve the sensitivity of a radical curing reaction instead of using the conventional chain transfer agent has a structure similar to that of a (meth)acrylate that is commonly used or alternatively, the compound itself has a structure of a (meth) acrylate, a risk that the physical properties of a cured product are deteriorated due to separation or precipitation is reduced or alternatively, the compound can be used instead of a common (meth)acrylate. In addition, if the compound is not constituted by a polymer, there is no risk that the viscosity unnecessarily increases. Therefore, as a result of experimentally producing and studying various compounds, it was found that a compound having the structure represented by Formula 1 itself can be used as a (meth)acrylate and also has a chain transfer ability.

In this manner, with the above (meth)acrylate, it is possible to suppress an adverse effect on the physical properties of a curable material compared with the case where the conventional chain transfer agent is used. Furthermore, since the above (meth)acrylate has a structure in which $R_4$ in Formula 1 is an alkyl chain that is not constituted by a polymer, a curable material having a low viscosity can be obtained.

The case where a low-viscosity curable material is needed is a case where an adherend has a narrow portion and it is necessary to infiltrate the curable material into a deeper portion, for example. It is preferable that a specific viscosity of the curable material in such a case is commonly 1 Pa·s or less, which is a low viscosity. The viscosity of the curable material is more preferably in a range of 0.01 to 0.8 Pa·s.

It was found that the deep portion curability was enhanced and the sensitivity of a curing reaction was improved in a curable material to which the (meth)acrylate represented by Formula 1 was added, compared with the above curable material in which the (meth)acrylate was not used. Hereinafter, the deep portion curability will be described.

According to the curing principle of a common ultraviolet curable resin, a photopolymerization initiator absorbs ultraviolet rays (ultraviolet light) to generate active species such as radical species, carbon-carbon double bonds in a (meth) acrylate or the like are radical-polymerized by the active species, and thus the ultraviolet curable resin is cured. However, a portion of the ultraviolet curable resin where ultraviolet rays are blocked remains uncured in the common ultraviolet curing. In contrast, the addition of the (meth) acrylate having a chain transfer ability represented by Formula 1 to a curable material makes it possible to transfer radicals produced by irradiation with ultraviolet rays to a position where ultraviolet rays are blocked and no radicals are generated, to initiate a polymerization reaction and promote the reaction, and to cure a dark portion (also referred to as a deep portion) where ultraviolet rays are blocked. That is, the addition of the (meth)acrylate represented by Formula 1 to a curable material makes it possible to impart a deep portion curability with which a deep portion that is apart from a surface irradiated with irradiation light and is unlikely to be irradiated with the irradiation light can be cured.

A method for manufacturing the (meth)acrylate represented by Formula 1 will be described. The (meth)acrylate represented by Formula 1 can be synthesized through one stage by using a general-purpose isocyanate compound and a hydroxyalkyl(meth)acrylate to react an isocyanate group of the isocyanate compound with a hydroxyl group of a hydroxyl group-containing (meth)acrylate, for example. With this synthesis, it is unnecessary to perform a reaction using a solvent, a polymerization reaction, or the like.

Examples of the above isocyanate-containing compound include monoisocyanates, diisocyanates, and polyisocyanates having three or more functional groups. One example of the monoisocyanates is stearyl isocyanate. Examples of the diisocyanates include aliphatic isocyanates such as methylene diisocyanate, ethylene diisocyanate, tetramethylene diisocyanate, hexamethylene diisocyanate (HDI), dodecamethylene diisocyanate, 2,2,4-trimethylhexamethylene diisocyanate, lysine diisocyanate (LDI) and 1,3,6-hexamethylene triisocyanate; alicyclic isocyanates such as hydrogenated 4,4'-diphenylmethane diisocyanate (hydrogenated MDI), hydrogenated xylylene diisocyanate (hydrogenated XDI), 1,4-cyclohexane diisocyanate, hydrogenated 2,4-tolylene diisocyanate (hydrogenated TDI), isophorone diisocyanate (IPDI), and norbornene diisocyanate (NBDI); aromatic aliphatic isocyanates such as xylylene diisocyanate (XDI) and tetramethylxylylene diisocyanate (TMXDI); 1,4-diphenyl diisocyanate; 2,4- or 2,6-tolylene diisocyanate (TDI); 2,4- or 4,4-diphenylmethane diisocyanate (MDI), 1,5-naphthalene diisocyanate (NDI); 3,3'-dimethyl-4,4'-diphenylmethane diisocyanate; and O-tolidine diisocyanate. One example of the polyisocyanates having three or more functional group is aromatic isocyanates such as polyphenylmethane polyisocyanate (crude MDI), triphenylmethane triisocyanate and tris(isocyanate phenyl)thiophosphate can be taken as an example.

Examples of the above isocyanate compound further include biuret type polyisocyanates obtained by reacting the above polyisocyanate with water, adduct type polyisocyanates obtained by reacting the polyisocyanate with polyhydric alcohol such as trimethylolpropane, and polymers obtained by isocyanurating the polyisocyanate. The above compounds may be used alone or in a combination of two or more as the isocyanate compound.

A hydroxyl group-containing (meth)acrylate (also referred to as hydroxyalkyl(meth)acrylate) to be reacted with the above isocyanate compound is used. As the hydroxyalkyl(meth)acrylate, monoacrylates containing one acryloyl group and a hydroxyl group in one molecule, diacrylates containing two acryloyl groups and a hydroxyl group in one molecule, polyacrylates containing three or more acryloyl groups and a hydroxyl group in one molecule, and the like can be used.

For example, a compound represented by Formula 4 is preferable as the (meth)acrylate represented by Formula 1, which is obtained by reacting the above isocyanate compound with the hydroxyalkyl(meth)acrylate. If a monoacrylate is used, n in Formula 4 is one. If a diacrylate is used, n in Formula 4 is two. If a polyacrylate containing three acryloyl groups is used, n in Formula 4 is three.

[Chemical Formula 6]

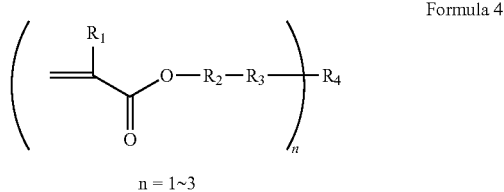

Formula 4 n = 1~3

It should be noted that $R_1$ to $R_4$ in Formula 4 are the same as those in Formula 1.

Specific examples of the above hydroxyalkyl(meth)acrylate include 2-hydroxyethyl acrylate, 2-hydroxypropyl acrylate, 2-hydroxybutyl acrylate, 4-hydroxybutyl acrylate, 1,4-cyclohexanedimethanol monoacrylate, 2-hydroxy-3-phenoxypropyl acrylate, 2-hydroxyethyl methacrylate, 2-hydroxypropyl methacrylate, and 2-hydroxybutyl methacrylate as the monoacrylate; 1-(acryloyloxy)-3-(methacryloyloxy)-2-propanol as the diacrylate; and pentaerythritol triacrylate as the polyacrylate.

An alkyl group of the hydroxyalkyl (meth)acrylate corresponds to $R_2$ in Formula 1, and is a $C_1$-$C_{10}$ alkyl chain that may be linear, branched or cyclic, may contain an unsaturated bond, and may contain a substituent, an ether bond and a thioether bond. It is preferable that $R_2$ is a $C_2$-$C_8$ linear alkyl chain or branched alkyl chain because appropriate volatility and viscosity can be obtained.

Specific examples of a compound obtained by reacting an isocyanate compound with a hydroxyalkyl(meth)acrylate include compounds represented by Formulae 5 to 15 below. It should be noted that specific manufacturing methods will be described later in Synthesis Examples 1 to 6.

The (meth)acrylate represented by Formula 5 is an example of a monofunctional acrylate. One example of the (meth)acrylate represented by Formula 5 is a compound represented by Formula 6 that is obtained by reacting stearyl isocyanate with hydroxypropyl acrylate.

[Chemical Formula 7]

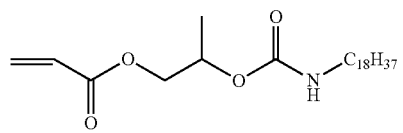

Formula 5

[Chemical Formula 8]

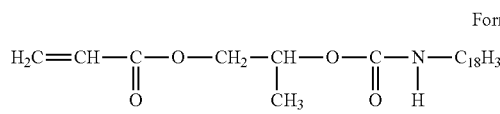

Formula 6

The (meth)acrylates represented by Formulae 7 to 16 are examples of a difunctional acrylate. One example of the (meth)acrylate represented by Formula 7 is a compound represented by Formula 8 that is obtained by reacting hexamethylene diisocyanate with hydroxypropyl acrylate.

[Chemical Formula 9]

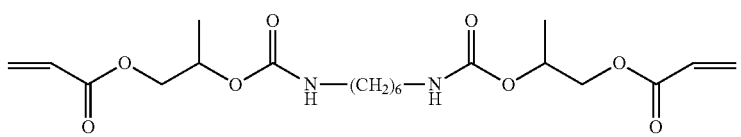

Formula 7

[Chemical Formula 10]

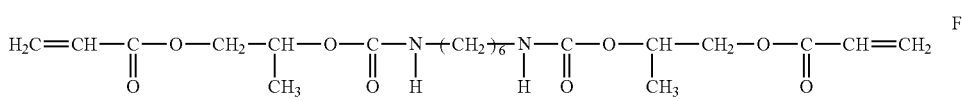

Formula 8

One example of the (meth)acrylate represented by Formula 9 is a compound represented by Formula 10 that is obtained by reacting isophorone diisocyanate with 2-hydroxypropyl acrylate.

[Chemical Formula 11]

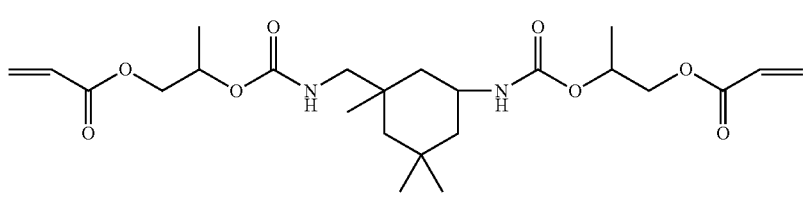

Formula 9

[Chemical Formula 12]

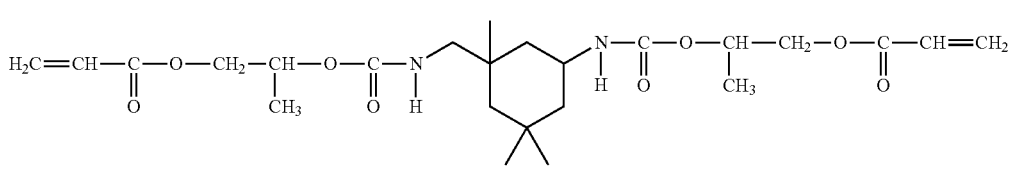

Formula 10

One example of the (meth)acrylate represented by Formula 11 is a compound represented by Formula 12 that is obtained by reacting isophorone diisocyanate with 2-hydroxyethyl acrylate.

[Chemical Formula 13]

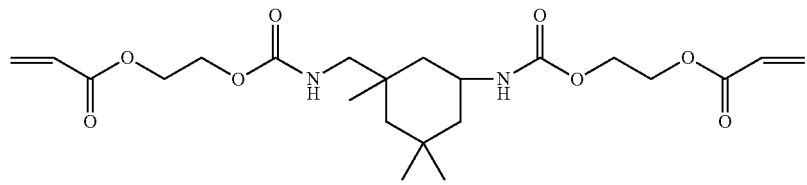

Formula 11

[Chemical Formula 14]

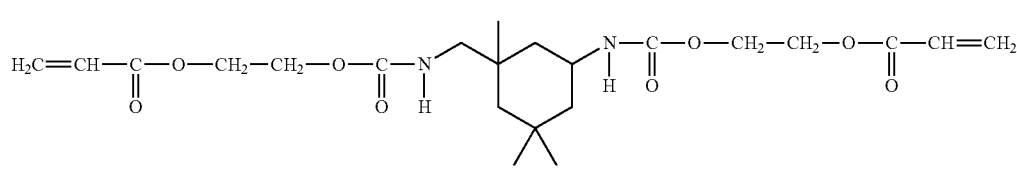

Formula 12

One example of the (meth)acrylate represented by Formula 13 is a compound represented by Formula 14 that is obtained by reacting isophorone diisocyanate with 4-hydroxybutyl acrylate.

[Chemical Formula 15]

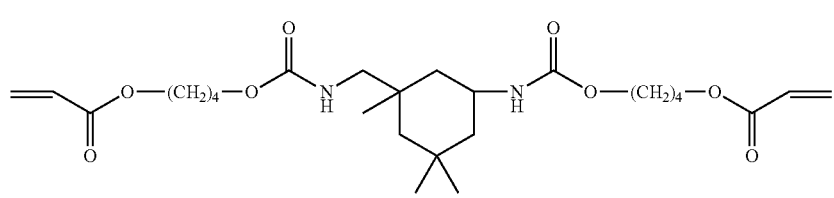

Formula 13

[Chemical Formula 16]

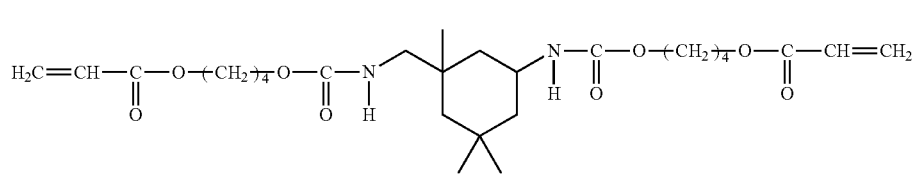

Formula 14

One example of the (meth)acrylate represented by Formula 15 is a compound represented by Formula 16 that is obtained by reacting tolylene diisocyanate with 2-hydroxypropyl acrylate.

[Chemical Formula 17]

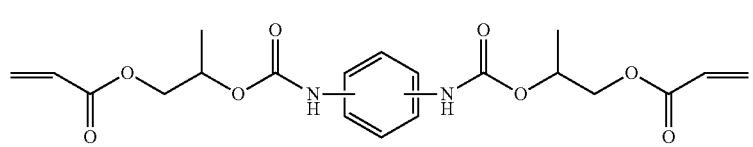

Formula 15

[Chemical Formula 18]

Formula 16

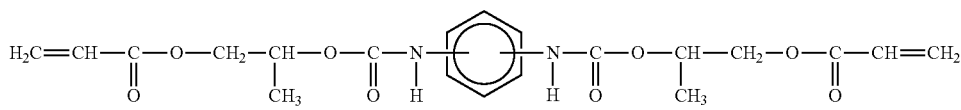

The above compounds are examples of a compound in which R₃ in Formula 1 has a structure represented by Formula 2. A (meth)acrylate in which R₃ in Formula 1 has a structure represented by Formula 3 can be manufactured by reacting an isocyanate compound with an aminoalkyl (meth)acrylate. A (meth)acrylate having a urea bond can also be manufactured by reacting an isocyanatealkyl(meth)acrylate having an isocyanate and a (meth)acrylate in one molecule with an alkylamine.

Examples of the isocyanatealkyl (meth)acrylate include 2-isocyanateethyl acrylate, 2-isocyanateethyl methacrylate, and 1,1-(bisacryloyloxymethyl)ethyl isocyanate. Examples of the alkylamine include monoamines, diamines, or triamines that have a carbon chain with 2 to 18 carbons.

The (meth)acrylate can also be manufactured by reacting the isocyanatealkyl(meth)acrylate with an alkyl alcohol such as a monoalcohol or a low molecular weight diol. In this case, R₃ in Formula 1 is a urethane bond represented by Formula 2.

Hereinafter, a curable material according to the present invention will be described. The curable material includes a radical curable material that contains a (meth)acrylate having the above specific structure in the composition. The curable material can contain a general-purpose (meth)acrylate, a metal-containing compound, a photopolymerization initiator, and the like as components other than the (meth)acrylate having the specific structure. It is preferable that the (meth)acrylate having the specific structure is contained in the curable material in an amount of 1 mass % or more of the mass of the entire composition because more favorable curability can be obtained.

As the above general-purpose (meth)acrylate, any conventionally known compound having one or more (meth)acrylate groups in the molecule can be used without any particular limitations. Specific examples of the general-purpose (meth)acrylate include mono(meth)acrylates such as isobornyl(meth)acrylate, bornyl(meth)acrylate, tricyclodecanyl(meth)acrylate, dicyclopentanyl(meth)acrylate, dicyclopentenyl(meth)acrylate, cyclohexyl(meth)acrylate, (meth)acrylic acid, benzyl(meth)acrylate, 4-butylcyclohexyl (meth)acrylate, (meth)acryloyl morpholine, 2-hydroxyethyl (meth)acrylate, 2-hydroxypropyl(meth)acrylate, 4-hydroxybutyl(meth)acrylate, methyl(meth)acrylate, ethyl(meth)acrylate, propyl(meth)acrylate, isopropyl(meth)acrylate, octyl(meth)acrylate, isooctyl(meth)acrylate, nonyl(meth)acrylate, decyl(meth)acrylate, isodecyl(meth)acrylate, undecyl(meth)acrylate, dodecyl(meth)acrylate, lauryl(meth)acrylate, stearyl(meth)acrylate, isoste aryl(meth)acrylate, tetrahydrofurfuryl(meth)acrylate, polyethylene glycol mono (meth)acrylate, polypropylene glycol mono(meth)acrylate, methoxy ethylene glycol(meth)acrylate, ethoxyethyl(meth)acrylate, methoxy polyethylene glycol(meth)acrylate, methoxy polypropylene glycol(meth)acrylate, polyoxyethylene nonylphenyl ether acrylate, diacetone(meth)acrylamide, isobutoxymethyl(meth)acrylamide, N,N-dimethyl (meth)acrylamide, t-octyl(meth)acrylamide, dimethylaminoethyl(meth)acrylate, diethylaminoethyl (meth)acrylate, 7-amino-3,7-dimethyloctyl(meth)acrylate, N,N-diethyl(meth)acrylamide and N,N-dimethylaminopropyl(meth)acrylamide; and poly(meth)acrylates such as butanediol di(meth)acrylate, hexanediol di(meth)acrylate, nonanediol di(meth)acrylate, decanediol di(meth)acrylate, 2-butyl-2-ethyl-1,3-propanediol di(meth)acrylate, 2-hydroxy-3-acryloyloxypropyl methacrylate, dipropylene glycol di(meth)acrylate, tripropylene glycol di(meth)acrylate, triethylene glycol di(meth)acrylate, tetraethylene glycol di(meth)acrylate, tricyclodecane dimethylol di(meth)acrylate, 1,4-butanepolyol di(meth)acrylate, 1,6-hexane polyol di(meth)acrylate, neopentyl glycol di(meth)acrylate, polyethylene glycol di(meth)acrylate, polypropylene glycol di(meth)acrylate, 9,9-bis[4-(2-acryloyloxy ethoxy)phenyl] fluorene, polyester di(meth)acrylate, tris(2-hydroxyethyl) isocyanurate tri(meth)acrylate, tris(2-hydroxyethyl)isocyanurate di(meth)acrylate, tricyclodecane dimethylol di(meth) acrylate, EO adduct di(meth)acrylate of bisphenol A, EO adduct or PO adduct polyol di(meth)acrylate of hydrogenated bisphenol A, epoxy(meth)acrylate obtained by adding (meth)acrylate to diglycidyl ether of bisphenol A, triethylene glycol divinyl ether, trimethylolpropane tri(meth)acrylate, pentaerythritol tri(meth)acrylate, trimethylol propane EO adduct tri(meth)acrylate, trisacryloyloxy ethyl phosphate, pentaerythritol tetra(meth)acrylate, tetrafurfuryl alcohol oligo(meth)acrylate, ethyl carbitol oligo(meth)acrylate, 1,4-butane diol oligo(meth)acrylate, 1,6-hexanediol oligo(meth) acrylate, trimethylolpropane oligo(meth)acrylate, pentaerythritol oligo(meth)acrylate, (poly)urethane (meth) acrylate and (poly)butadiene (meth)acrylate. These may be used alone or in a combination of two or more.

As the metal-containing compound to be added to the above curable material, it is preferable to use one or more metals selected from tin, copper, zinc, cobalt, and nickel as metal species. As the metal-containing compound, it is possible to use any conventionally known compound containing one or more of the above metals in the form of a metal salt or complex in the constituent molecule, without any particular limitations. It is preferable that the metal-containing compound is contained in the curable material in an amount of 0.0005 mass % or more of the entire curable material.

It is preferable that the metal-containing compound is in the form of a metal salt such as an organic salt or a metal complex because the mixing with the curable material is facilitated and precipitation during storage is prevented.

Examples of the metal salt include carboxylates, phosphates, sulfonates, hydrochlorides, bromates, and chlorates (perchlorates, chlorites) of the metal species.

As the metal complex, it is possible to use any conventionally known metal complex that is stabilized by being ligated with an organic ligand capable of forming a coordinate bond with the metal species at 1:1 to 1:4 (metal:ligand), without any particular limitations.

Specific examples of the metal-containing compound include bis(2,4-pentanedionato)tin, dibutyltin bis(trifluoromethanesulfonate), dibutyltin diacetate, dibutyltin dilaurate, dibutyltin maleate, phthalocyanine tin(IV) dichloride, tetrabutylammonium difluoro triphenyltin, phthalocyanine tin(II), tributyl(2-pyridyl)tin, tributyl(2-thienyl)tin, tributyltin acetate, tributyl(trimethylsilylethynyl)tin, trimethyl (2-pyridyl)tin, bis(hexafluoroacetylacetonato)copper(II), bis (2,4-pentanedionato)copper(II), bis(1,3-propanediamine) copper(II)dichloride, bis(8-quinolinolato)copper(II), bis(trifluoro-2,4-pentanedionato)copper(II), copper(II) bis(2-hydroxyethyl)dithiocarbamate, copper diethyldithiocarbamate, copper (II) dimethyldithiocarbamate, copper(II) disodium ethylenediaminetetraacetate, phthalocyanine copper(II), dichloro(1,10-phenanthroline) copper (II), phthalocyanine copper, tetra-4-tert-butylphthalocyanine copper, tetrakis(acetonitrile)copper(I) hexafluorophosphate, copper naphthenate, bis[2-(2-benzothiazolyl)phenolate]zinc (II), bis[2-(2-benzoxazolyl)phenolate]zinc(II), bis(2-hydroxyethyl)zinc(II) dithiocarbamate, bis(2,4-pentanedionato)zinc(II), bis(8-quinolinolato)zinc(II), bis (tetrabutylammonium)bis(1,3-dithiol-2-thione-4,5-dithiolato) zinc complex, zinc disodium ethylene diaminetetraacetate, zinc(II) dibenzyl dithiocarbamate, zinc (II) dibutyl dithiocarbamate, zinc diethyldithiocarbamate, zinc dimethyldithiocarbamate, zinc phthalocyanine, zinc naphthenate, bis(cyclopentadienyl)cobalt(III)hexafluorophosphate, [1,1'-bis(diphenylphosphino)ferrocene]cobalt(II) dichloride, bis(hexafluoroacetylacetonato)cobalt(II), (1R, 2R)—N,N'-bis[3-oxo-2-(2,4,6-trimethylbenzoyl) butylidene]-1,2-diphenylethylenediaminato cobalt(II), (1S, 2S)—N,N'-bis[3-oxo-2-(2,4,6-trimethylbenzoyl) butylidene]-1,2-diphenylethylenediaminato cobalt(II), bis (2,4-pentanedionato)cobalt(II), bis(trifluoro-2,4-pentanedionato)cobalt(II), phthalocyanine cobalt(II), cobalt disodium ethylene diaminetetraacetate, hexaamminecobalt (III) chloride, N,N'-disalicylalethylenediamine cobalt(II), [5,10,15,20-tetrakis(4-methoxyphenyl)porphyrinato]cobalt (II), tris(2,4-pentanedionato)cobalt(III), cobalt naphthenate, [1,2-bis(diphenylphosphino)ethane]nickel(II)dichloride, bis (dithiobenzyl)nickel(II), bis(hexafluoroacetylacetonato) nickel(II), bis(2,4-pentanedionato)nickel(II), bis(tetrabutylammonium)bis(maleonitriledithiolato)nickel(II) complex, bis(tricyclohexylphosphine)nickel(II) dichloride, bis(triphenylphosphine)nickel(II) dichloride, bromo[(2,6-pyridinediyl)bis(3-methyl-1-imidazolyl-2-ylidene)]nickel bromide, nickel(II) disodium ethylenediaminetetraacetate, nickel(II) dibutyldithiocarbamate, and nickel diethyldithiocarbamate. These may be used alone or in a combination of two or more.

As the photopolymerization initiator to be added to the curable material, any conventionally known compound that absorbs ultraviolet rays to initiate radical polymerization can be used without any particular limitations.

Specific examples of the photopolymerization initiator include 1-hydroxycyclohexyl phenyl ketone, 2,2-dimethoxy-2-phenylacetophenone, xanthone, fluorenone, benzaldehyde, fluorene, anthraquinone, ethylanthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethylketal, 1-(4-isopropylphenyl)-2-hydroxy-2-methylpropane-1-one, 2-hydroxy-2-methyl-1-phenylpropane-1-one, thioxanthone, diethylthioxanthone, 2-isopropylthioxanthone, 2-chlorothioxanthone, 2-methyl-1-[4-(methylthio)phenyl]-2-morpholino-propane-1-one, 2,4,6-trimethylbenzoyl diphenylphosphine oxide, and bis-(2,6-dimethoxybenzoyl)-2,4,4-trimethylpentyl phosphine oxide. These may be used alone or in a combination of two or more.

As the photopolymerization initiator, commercially available products can also be used, such as IRGACURE 184, 369, 651, 500 and 907, CGI 1700, CGI 1750, CGI 1850, CG 24-61; Darocure 1116 and 1173, Lucirin TPO (all manufactured by BASF), and Ubecryl P36 (manufactured by UCB).

Although there is no particular limitation on the method of manufacturing the curable material as long as the above components are mixed at room temperature or under a heating condition, it is preferable to use a method in which the components are dissolved or uniformly dispersed by being sufficiently stirred or kneaded at an appropriate temperature under reduced pressure or inert gas atmosphere, such as nitrogen, by using a stirring device such as a mixer.

The curable material can contain additives other than the above components as needed. Examples of the additives include a stabilizing agent, a softening agent, a pigment, a dye, an antistatic agent, a flame retardant, a sensitizer, a dispersing agent, a solvent, and an antibacterial/antifungal agent. These various additives can be used in combination as appropriate.

The curable material according to the present invention can be cured by being radical-polymerized by light, such as ultraviolet rays, or heat. The curable material can be used in an adhesive material, a coating material, a sealing material, a molding material and the like of an automobile component, an electrical/electronic device, an aircraft component and the like.

The ultraviolet irradiation condition for curing the curable material using ultraviolet rays to produce a cured product can be selected as appropriate according to the composition and the like of the curable material. A known apparatus can be used as the irradiation apparatus used for ultraviolet irradiation. As the irradiation apparatus, a light source such as a valve-type UV lamp in which Hg, Hg/Xe, a metal halide compound, or the like is encapsulated, and an LED-UV lamp can be used, for example. A light collection-type UV irradiation apparatus that collects light from the above-described light source by a reflection mirror and radiates the light can also be used as the ultraviolet irradiation apparatus.

WORKING EXAMPLES

Hereinafter, the present invention will be described in detail by way of working examples. It should be noted that the present invention is not limited to these working examples. Table 1 shows preparative examples, working examples and comparative examples of the photo curable material, and Table 2 shows preparative examples, working examples and comparative examples of the heat curable material. The components shown in Table 1 or 2 were dissolved or dispersed by being mixed with a stirrer with the compositions (parts by mass) shown in the tables to yield ultraviolet curable materials and heat curable materials shown in the tables.

The abbreviations in Tables 1 and 2 are as described below. Those without any indication of manufacturers were of reagent grade, purchased from Tokyo Chemical Industry Co., Ltd.

(Meth) acrylate
  IBA: Isobornyl acrylate
  DPGA: Dipropylene glycol diacrylate
  HPGA: Heptapropylene glycol diacrylate
  STA (Synthesis Example 1)
  IPHA (Synthesis Example 2)
  IPIPA (Synthesis Example 3)

EIPA (Synthesis Example 4)
BIPA (Synthesis Example 5)
IPTA (Synthesis Example 6)
Photopolymerization (ultraviolet-polymerization) initiator
HCHPK: 1-Hydroxycyclohexyl phenyl ketone
Heatpolymerization initiator
AIBN: Azobisisobutyronitrile
Metal-containing compound
BPDZ: Bis(2,4-pentanedionato)zinc (II)

Synthesis Example 1

Synthesis of STA

Into a reaction vessel equipped with a stirrer, 100 g (0.338 mol) of stearyl isocyanate (M.W. 295.5), 44 g (0.338 mol) of hydroxypropyl acrylate (M.W. 130.1), and 0.05 g of dibutyltin dilaurate were poured, and the liquid temperature was increased from room temperature to 50° C. over one hour, under stirring. Subsequently, a small portion was sampled, and stirring was continued at 50° C., while the absorption of the isocyanate near 2300 cm$^{-1}$ was being examined by FT-IR measurement. The point in time at which the absorption disappeared was regarded as the completion of the reaction, and a colorless transparent viscous liquid was obtained. The obtained acrylate is a compound represented by Formula 5. This was named STA.

Synthesis Example 2

Synthesis of IPHA

Into a reaction vessel equipped with a stirrer, 100 g (0.595 mol) of hexamethylene diisocyanate (M.W. 168.1), 154.8 g (1.190 mol) of hydroxypropyl acrylate (M.W. 130.1), and 0.05 g of dibutyltin dilaurate were poured, and the liquid temperature was increased from room temperature to 50° C. over one hour, under stirring. Subsequently, a small portion was sampled, and stirring was continued at 50° C., while the absorption of the isocyanate near 2300 cm$^{-1}$ was being examined by FT-IR measurement. The point in time at which the absorption disappeared was regarded as the completion of the reaction, and a colorless transparent viscous liquid was obtained. The obtained acrylate is a compound represented by Formula 7. This was named IPHA.

Synthesis Example 3

Synthesis of IPIPA

Into a reaction vessel equipped with a stirrer, 132.3 g (0.595 mol) of isophorone diisocyanate (M.W. 222.3), 154.8 g (1.190 mol) of hydroxypropyl acrylate (M.W. 130.1), and 0.05 g of dibutyltin dilaurate were poured, and the liquid temperature was increased from room temperature to 50° C. over one hour, under stirring. Subsequently, a small portion was sampled, and stirring was continued at 50° C., while the absorption of the isocyanate near 2300 cm$^{-1}$ was being examined by FT-IR measurement. The point in time at which the absorption disappeared was regarded as the completion of the reaction, and a colorless transparent viscous liquid was obtained. The obtained acrylate is a compound represented by Formula 9. This was named IPIPA.

Synthesis Example 4

Synthesis of EIPA

Synthesis was performed in the same manner as in Synthesis Example 3, except that hydroxypropyl acrylate was changed to 138.2 g (1.190 mol) of hydroxyethyl acrylate (M.W. 116.1), and a colorless viscous liquid was obtained. The obtained acrylate is a compound represented by Formula 11. This was named EIPA.

Synthesis Example 5

Synthesis of BIPA

Synthesis was performed in the same manner as in Synthesis Example 3, except that hydroxypropyl acrylate was changed to 171.6 g (1.190 mol) of 4-hydroxybutyl acrylate (M.W. 144.2), and a colorless viscous liquid was obtained. The obtained acrylate is a compound represented by Formula 13. This was named BIPA.

Synthesis Example 6

Synthesis of IPTA

Synthesis was performed in the same manner as in Synthesis Example 3, except that isophorone diisocyanate was changed to 103.6 g (0.595 mol) of tolylene diisocyanate (M.W. 174.16), and a colorless viscous liquid was obtained. The obtained acrylate is a compound represented by Formula 15. This was named IPTA.

Method for Evaluating Deep Portion Curability

Each of the compositions shown in Tables 1 and 2 was placed into a hard Teflon tube (Teflon is a registered trademark) having an inner diameter of 10 mm whose bottom was stopped by a Teflon plug such that the liquid level was at a height of 50 mm. Each photo curable material having the composition shown in Table 1 was irradiated with ultraviolet rays from above for 2 seconds using a UV lamp (manufactured by SEN LIGHTS Co., Ltd., 100 mW/cm$^2$). Hot air of about 100° C. was blown on each heat curable material having the composition shown in Table 2 from above for 15 seconds. If a radical polymerization reaction occurs, the compositions are cured and solidified. Therefore, when the Teflon plug is removed from the bottom, the composition that remains in a liquid state in which no radical polymerization reaction occurs flows down, and a solidified product (radical-polymerized product) remains in the Teflon tube. That is, the longer the cured product remaining in the Teflon tube is, the more the radical polymerization reaction advances even in a deep portion that is unlikely to be illuminated or heated, which means that a curing reaction can be induced with higher sensitivity using a constant amount of light or heat energy. Accordingly, the lengths of the cured products remaining in the Teflon tube are shown in Tables 1 and 2 as indices of curability.

Evaluation Results

Existing (meth)acrylates were used in Comparative Examples 1 to 6 and the sensitivity thereof was not improved. Therefore, the portion equal to or deeper than 30 mm was insufficiently cured, showing that the irradiated light and heat energy insufficiently induced the radical polymerization reaction. In contrast, the remaining cured products of the compositions of Working Examples 1 to 28 in which the (meth)acrylates according to the present invention were used were obviously longer than those of the compositions of the comparative examples, and thus it was confirmed that even the deep portion that was unlikely to be illuminated or heated and could not be cured using a conventional photo curable material or heat curable material was cured by the radical polymerization reaction, and that the sensitivity of the curable material was improved. That is, this means that the curable material can be cured so as to have a complicated shape or a thick shape with low energy.

TABLE 1

| | | Prep. Ex., Work. Ex. | | | | | | | | | | | | | | Prep. Ex., Comp. Ex. | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 1 | 2 | 3 |
| (Meth)acrylate | IBA | 80 | 70 | 70 | 70 | 70 | 70 | 70 | 70 | | 10 | 89 | 70 | 70 | 70 | 100 | | |
| | DPGA | | 10 | | | | | | | | | | | | | | | 100 | |
| | HPGA | | | 10 | 10 | 10 | 10 | 10 | 10 | | | 10 | 10 | 10 | 10 | | | 100 |
| | STA | | | | 20 | | | | | | | | | | | | | | |
| | IPHA | | | | | 20 | | | | | | | | | | | | | |
| | IPIPA | 20 | 20 | 20 | | | | | | | 20 | 90 | 1 | 20 | 20 | 20 | | | |
| | EIPA | | | | | | 20 | | | | | | | | | | | | |
| | BIPA | | | | | | | 20 | | | | | | | | | | | |
| | IPTA | | | | | | | | 20 | | | | | | | | | | |
| Photo-polymerization initiator | HCHPK | 1 | 1 | 1 | 1 | 1 | 1 | 1 | 1 | 1 | 1 | 1 | 1 | 1 | 1 | 1 | 1 | 1 |
| Metal-containing compound | BPDZ | 0.5 | 0.5 | 0.5 | 0.5 | 0.5 | 0.5 | 0.5 | 0.5 | 0.5 | 0.5 | 0.5 | | 0.0005 | 20 | 0.5 | 0.5 | 0.5 |
| Length of remaining cured product (mm) | | 5.7 | 7.6 | 7.8 | 6.4 | 6.8 | 7.6 | 7.7 | 7.1 | 8.2 | 8.0 | 6.0 | 6.3 | 7.0 | 6.9 | 2.0 | 2.1 | 1.8 |

TABLE 2

| | | Prep. Ex., Work. Ex. | | | | | | | | | | | | | | Prep. Ex., Comp. Ex. | | |
|---|---|---|---|---|---|---|---|---|---|---|---|---|---|---|---|---|---|---|
| | | 15 | 16 | 17 | 18 | 19 | 20 | 21 | 22 | 23 | 24 | 25 | 26 | 27 | 28 | 4 | 5 | 6 |
| (Meth)acrylate | IBA | 80 | 70 | 70 | 70 | 70 | 70 | 70 | 70 | | 10 | 89 | 70 | 70 | 70 | 100 | | |
| | DPGA | | 10 | | | | | | | | | | | | | | | 100 | |
| | HPGA | | | 10 | 10 | 10 | 10 | 10 | 10 | | | 10 | 10 | 10 | 10 | | | 100 |
| | STA | | | | 20 | | | | | | | | | | | | | | |
| | IPHA | | | | | 20 | | | | | | | | | | | | | |
| | IPIPA | 20 | 20 | 20 | | | | | | | 20 | 90 | 1 | 20 | 20 | 20 | | | |
| | EIPA | | | | | | 20 | | | | | | | | | | | | |
| | BIPA | | | | | | | 20 | | | | | | | | | | | |
| | IPTA | | | | | | | | 20 | | | | | | | | | | |
| Heat-polymerization initiator | AIBN | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Metal-containing compound | BPDZ | 0.5 | 0.5 | 0.5 | 0.5 | 0.5 | 0.5 | 0.5 | 0.5 | 0.5 | 0.5 | 0.5 | | 0.0005 | 20 | 0.5 | 0.5 | 0.5 |
| Length of remaining cured product (mm) | | 6.6 | 6.8 | 7.0 | 6.4 | 7.2 | 7.8 | 7.5 | 7.0 | 8.0 | 7.8 | 7.0 | 7.6 | 6.7 | 7.9 | 2.9 | 2.8 | 2.2 |

Working Examples 29 and 30 and Comparative Examples 7 and 8 were evaluated for compatibility, viscosity, and the like. Hereinafter, an evaluation method and evaluation results will be described.

Method for Evaluating Compatibility and Viscosity

The components shown in Table 3 were dissolved or dispersed by being mixed with a stirrer with the compositions (parts by mass) shown in the table to yield curable materials of Working Examples 29 and 30 and Comparative Examples 7 and 8. Curable materials prepared using a chain transfer agent (UP-1: Synthesis Example 7) using a polymer were used in the comparative examples. Right after each material was prepared, a turbidity was observed visually, and then the viscosity at 25° C. was measured using a rotational viscometer. Subsequently, the curable material was cured so as to have a shape of a No. 8 dumbbell piece with a thickness of 0.5 mm, and breaking elongation (%) was measured by performing tensile testing with 20 mm/min. Table 3 shows the measurement results of the turbidity, viscosity, and breaking elongation.

Synthesis Example 7

Synthesis of UP-1

Into a reaction vessel equipped with a stirrer, 80 g (200 mmol) of polypropylene glycol with a number-average molecular weight of 400, 40 g (238 mmol) of hexamethylene diisocyanate, and 0.05 g of dibutyltin dilaurate were poured, and the liquid temperature was increased from room temperature to 50° C. over one hour, under stirring. Subsequently, a small portion was sampled, and stirring was continued at 50° C., while the absorption of the isocyanate near 2300 cm$^{-1}$ was being examined by FT-IR measurement. The amount of the residual isocyanate group contained was calculated from the absorption area of FT-IR, and the point in time at which the content was reduced to about 15% of the content before the reaction and ceased to change was regarded as the completion of the reaction, and a colorless transparent viscous liquid was obtained. Next, 100 g (33 mmol) of this viscous liquid, 8.2 g (70.6 mmol) of 2-hydroxyethyl acrylate, and 0.02 g of pentaerythritol tetrakis

[3-(3,5-di-tert-butyl-4-hydroxyphenyl)propionate] were poured, and the liquid temperature was increased from room temperature to 50° C. over one hour, under stirring. Subsequently, a small portion was sampled, and stirring was continued at 50° C. while the absorption of the isocyanate near 2300 cm$^{-1}$ was being examined by FT-IR measurement. The amount of the residual isocyanate group contained was estimated from the absorption area of FT-IR, and the point in time at which the absorption disappeared was regarded as the completion of the reaction, and a colorless transparent viscous liquid was obtained. This was named UP-1. UP-1 is a urethane bond-containing compound having a number molecular weight of about 3200 and having acrylate groups at its ends.

Evaluation Results of Compatibility and Viscosity

Since the chain transfer agent used in Comparative Examples 7 and 8 was constituted by a polymer, the chain transfer agent had insufficient compatibility with the other components, and thus a slight turbidity was visually confirmed. The curable material had a viscosity of 5 Pa·s or more. The breaking elongation was 200% or less, which was smaller than those of Working Examples 29 and 30. It was inferred that this was because the chain transfer agent, which was constituted by a polymer, had insufficient compatibility with the other components as described above. In contrast, the compositions of Working Examples 29 and 30 in which the (meth)acrylates according to the present invention were used were clear and had sufficient compatibility, and the breaking elongation was 300% or more, which was favorable. The viscosity was 1 Pa·s or less, and therefore, a low-viscosity type curable material could be manufactured.

TABLE 3

|  |  | Prep. Ex., Work. Ex. | | Prep. Ex., Comp. Ex. | |
| --- | --- | --- | --- | --- | --- |
|  |  | 29 | 30 | 7 | 8 |
| (Meth)acrylate, chain transfer agent | IBA | 70 | 70 | 70 | 70 |
|  | DPGA | 10 |  | 10 |  |
|  | HPGA |  | 10 |  | 10 |
|  | IPIPA | 20 | 20 |  |  |
|  | UP-1 |  |  | 20 | 20 |
| Photopolymerization initiator | HCHPK | 1 | 1 | 1 | 1 |
| Metal-containing compound | BPDZ | 0.5 | 0.5 | 0.5 | 0.5 |
| Turbidity (visually) |  | Clear | Clear | Slightly turbid | Slightly turbid |
| Viscosity (Pa · s) |  | 0.8 | 0.9 | 5.8 | 7.5 |
| Breaking elongation (%) |  | 310 | 320 | 121 | 181 |

Table 4 shows the molar contents (mol/g) of the structure represented by Formula 2 (urethane bond) in the (meth)acrylates of Synthesis Examples 1 to 7 (No. 1 to 7). The molar contents shown in Table 4 are values calculated with the assumption that all the isocyanate groups of the mixed isocyanate compound are turned into urethane bonds. As shown in Table 4, all the molar contents were 0.001 mol/g or more in the (meth)acrylates of Synthesis Examples 1 to 7, and the cured products to which the (meth)acrylates were added had a favorable curability.

TABLE 4

| No. | Abbreviation | Molar content of urethane bond (mol/g) |
| --- | --- | --- |
| 1 | STA | 0.00235 |
| 2 | IPHA | 0.00467 |

TABLE 4-continued

| No. | Abbreviation | Molar content of urethane bond (mol/g) |
| --- | --- | --- |
| 3 | IPIPA | 0.00414 |
| 4 | EIPA | 0.00440 |
| 5 | BIPA | 0.00392 |
| 6 | IPTA | 0.00461 |
| 7 | UP-1 | 0.00366 |

While the embodiment of the present invention has been described in detail, the present invention is not limited to the above-described embodiment, and various modifications can be made without departing from the gist of the present invention.

The invention claimed is:
1. A radical curable material comprising:
a (meth)acrylate consisting of a structure represented by Formula 1:

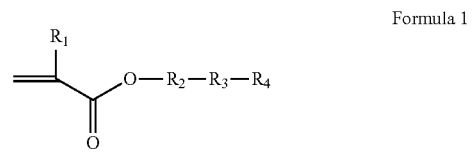

Formula 1 where $R_1$ is a hydrogen atom or a methyl group, $R_2$ is a $C_1$-$C_{10}$ alkylene group, $R_3$ is either Formula 2:

Formula 2 or Formula 3:

Formula 3 and $R_4$ is an alkyl chain constituted by carbon atoms and hydrogen atoms,
the (meth)acrylate being obtained by directly reacting a hydroxyl group of a (meth)acrylate having a hydroxyl group or an amino group of a (meth)acrylate having an amino group with an isocyanate group of a monoisocyanate compound; and
at least one metal-containing compound selected from the group consisting of bis(2,4-pentanedionato)tin, dibutyltin bis(trifluoromethanesulfonate), dibutyltin diacetate, dibutyltin maleate, phthalocyanine tin(IV) dichloride, tetrabutylammonium difluoro triphenyltin, phthalocyanine tin(II), tributyl(2-pyridyl)tin, tributyl (2-thienyl)tin, tributyltin acetate, tributyl(trimethylsilylethynyl)tin, trimethyl (2-pyridyl)tin, bis(hexafluoroacetylacetonato)copper(II), bis(2,4-pentanedionato) copper(II), bis(1,3-propanediamine)copper(II) dichloride, bis(8-quinolinolato)copper(II), bis (trifluoro-2,4-pentanedionato)copper(II), copper(II) bis (2-hydroxyethyl) dithiocarbamate, copper diethyldithiocarbamate, copper (II) dimethyldithiocarbamate, copper(II) disodium ethylenediaminetetraacetate, phthalocyanine copper(II), dichloro(1,10-phenanthroline) copper(II), phthalocyanine copper, tetra-4-tert-butylphthalocyanine copper, tetrakis(acetonitrile)copper(I) hexafluorophosphate, bis[2-(2-benzothiazolyl)phenolate]zinc(II), bis[2-(2-benzoxazolyl)phenolate]zinc(II), bis(2-hydroxyethyl)zinc(II) dithiocarbamate, bis(2,4-pentanedionato)zinc(II), bis(8-quinolinolato)zinc(II), bis(tetrabutylammonium)bis(1,3-dithiol-2-thione-4,5-dithiolato) zinc complex, zinc disodium ethylenediaminetetraacetate, zinc(II) dibenzyl dithiocarbamate, zinc (II) dibutyl dithiocarbamate, zinc diethyldithiocarbamate, zinc dimethyldithiocarbamate, zinc phthalocyanine, bis(cyclopentadienyl)cobalt(III)hexafluorophosphate, [1,1'-bis(diphenylphosphino)ferrocene]cobalt(II)dichloride, bis(hexafluoroacetylacetonato)cobalt(II), (1R,2R)—N,N'-bis[3-oxo-2-(2,4,6-trimethylbenzoyl)butylidene]-1,2-diphenylethylenediaminato cobalt(II), (1S,2S)—N,N'-bis[3-oxo-2-(2,4,6-trimethylbenzoyl)butylidene]-1,2-diphenylethylenediaminato cobalt(II), bis(2,4-pentanedionato)cobalt(II), bis(trifluoro-2,4-pentanedionato)cobalt(II), phthalocyanine cobalt(II), cobalt disodium ethylenediaminetetraacetate, hexaamminecobalt(III) chloride, N,N'-disalicylalethylenediamine cobalt(II), [5,10,15,20-tetrakis(4-methoxyphenyl)porphyrinato]cobalt(II), tris(2,4-pentanedionato) cobalt(III), [1,2-bis(diphenylphosphino)ethane]nickel (II)dichloride, bis(dithiobenzyl)nickel(II), bis(hexafluoroacetylacetonato)nickel(II), bis(2,4-pentanedionato)nickel(II), bis(tetrabutylammonium) bis(maleonitriledithiolato)nickel(II) complex, bis(tricyclohexylphosphine)nickel(II) dichloride, bis(triphenylphosphine)nickel(II) dichloride, bromo[(2,6-pyridinediyl)bis(3-methyl-1-imidazolyl-2-ylidene)] nickel bromide, nickel(II) disodium ethylenediaminetetraacetate, nickel(II) dibutyldithiocarbamate, and nickel diethyldithiocarbamate.

2. A radical curable material comprising:
a (meth)acrylate consisting of a structure represented by Formula 17:

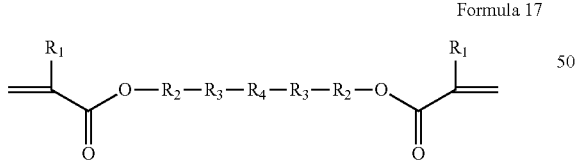

Formula 17 where $R_1$ is a hydrogen atom or a methyl group, $R_2$ is a $C_1$-$C_{10}$ alkylene group, $R_3$ is either Formula 2:

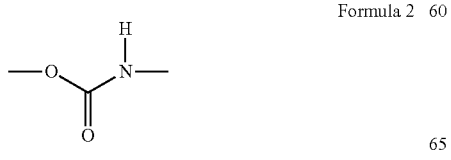

Formula 2 or Formula 3:

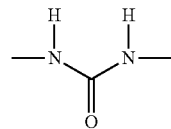

Formula 3 and $R_4$ is an alkylene chain constituted by carbon atoms and hydrogen atoms,
the (meth)acrylate being obtained by directly reacting a hydroxyl group of a (meth)acrylate having a hydroxyl group or an amino group of a (meth)acrylate having an amino group with an isocyanate group of a diisocyanate compound; and
at least one metal-containing compound selected from the group consisting of bis(2,4-pentanedionato)tin, dibutyltin bis(trifluoromethanesulfonate), dibutyltin diacetate, dibutyltin maleate, phthalocyanine tin(IV) dichloride, tetrabutylammonium difluoro triphenyltin, phthalocyanine tin(II), tributyl(2-pyridyl)tin, tributyl(2-thienyl)tin, tributyltin acetate, tributyl(trimethylsilylethynyl)tin, trimethyl (2-pyridyl)tin, bis(hexafluoroacetylacetonato)copper(II), bis(2,4-pentanedionato) copper(II), bis(1,3-propanediamine)copper(II) dichloride, bis(8-quinolinolato)copper(II), bis(trifluoro-2,4-pentanedionato)copper(II), copper(II) bis(2-hydroxyethyl) dithiocarbamate, copper diethyldithiocarbamate, copper (II) dimethyldithiocarbamate, copper(II) disodium ethylenediaminetetraacetate, phthalocyanine copper(II), dichloro(1,10-phenanthroline) copper(II), phthalocyanine copper, tetra-4-tert-butylphthalocyanine copper, tetrakis(acetonitrile)copper(I) hexafluorophosphate, bis[2-(2-benzothiazolyl)phenolate]zinc(II), bis[2-(2-benzoxazolyl)phenolate]zinc(11), bis(2-hydroxyethyl)zinc(II) dithiocarbamate, bis(2,4-pentanedionato)zinc(II), bis(8-quinolinolato)zinc(II), bis(tetrabutylammonium)bis(1,3-dithiol-2-thione-4,5-dithiolato) zinc complex, zinc disodium ethylenediaminetetraacetate, zinc(II) dibenzyl dithiocarbamate, zinc (II) dibutyl dithiocarbamate, zinc diethyldithiocarbamate, zinc dimethyldithiocarbamate, zinc phthalocyanine, bis(cyclopentadienyl)cobalt(III)hexafluorophosphate, [1,1'-bis(diphenylphosphino)ferrocene]cobalt(II)dichloride, bis(hexafluoroacetylacetonato)cobalt(II), (1R,2R)—N,N'-bis[3-oxo-2-(2,4,6-trimethylbenzoyl)butylidene]-1,2-diphenylethylenediaminato cobalt(II), (1S,2S)—N,N'-bis[3-oxo-2-(2,4,6-trimethylbenzoyl)butylidene]-1,2-diphenylethylenediaminato cobalt(II), bis(2,4-pentanedionato)cobalt(II), bis(trifluoro-2,4-pentanedionato)cobalt(II), phthalocyanine cobalt(II), cobalt disodium ethylenediaminetetraacetate, hexaamminecobalt(III) chloride, N,N'-disalicylalethylenediamine cobalt(II), [5,10,15,20-tetrakis(4-methoxyphenyl)porphyrinato]cobalt(II), tris(2,4-pentanedionato) cobalt(III), [1,2-bis(diphenylphosphino)ethane]nickel (II)dichloride, bis(dithiobenzyl)nickel(II), bis(hexafluoroacetylacetonato)nickel(II), bis(2,4-pentanedionato)nickel(II), bis(tetrabutylammonium) bis(maleonitriledithiolato)nickel(II) complex, bis(tricyclohexylphosphine)nickel(II) dichloride, bis(triphenylphosphine)nickel(II) dichloride, bromo[(2,6-pyridinediyl)bis(3-methyl-1-imidazolyl-2-ylidene)]

nickel bromide, nickel(II) disodium ethylenediaminetetraacetate, nickel(II) dibutyldithiocarbamate, and nickel diethyldithiocarbamate.

3. The radical curable material according to claim 1, wherein a molar content of the structure represented by Formula 2 or 3 (mole of functional group•bonding group per mass of (meth)acrylate) in the (meth)acrylate is 0.001 mol/g or more.

4. The radical curable material according to claim 1, comprising the metal-containing compound in an amount of 0.0005 mass % or more of the entire curable material.

5. The radical curable material according to claim 1, further comprising a photopolymerization initiator.

6. The radical curable material according to claim 1, further comprising a heat polymerization initiator.

7. The radical curable material according to claim 1, wherein $R_4$ in Formula 1 is one of a $C_1$-$C_{18}$ linear alkyl group, branched alkyl group, and cyclic alkyl chain, or a derivative thereof.

8. The radical curable material according to claim 2, wherein $R_4$ in Formula 17 is one of a $C_1$-$C_{18}$ linear alkylene group, branched alkylene group, and cyclic alkylene chain, or a derivative thereof.

9. The radical curable material according to claim 2, wherein a molar content of the structure represented by Formula 2 or 3 (mole of functional group•bonding group per mass of (meth)acrylate) in the (meth)acrylate is 0.001 mol/g or more.

10. The radical curable material according to claim 2, comprising the metal-containing compound in an amount of 0.0005 mass % or more of the entire curable material.

11. The radical curable material according to claim 2, further comprising a photopolymerization initiator.

12. The radical curable material according to claim 2, further comprising a heat polymerization initiator.

13. The radical curable material according to claim 1, wherein $R_3$ is represented by Formula 3.

14. The radical curable material according to claim 2, wherein $R_3$ is represented by Formula 3.

15. A method comprising curing the radiation curable material of claim 1 by radical polymerization via the carbon-carbon double bonds of the (meth)acrylate.

16. A method comprising curing the radiation curable material of claim 2 by radical polymerization via the carbon-carbon double bonds of the (meth)acrylate.

\* \* \* \* \*